J. W. CARAWAN.
CULTIVATING IMPLEMENT.
APPLICATION FILED SEPT. 23, 1911.
1,021,573.
Patented Mar. 26, 1912.
2 SHEETS—SHEET 1.
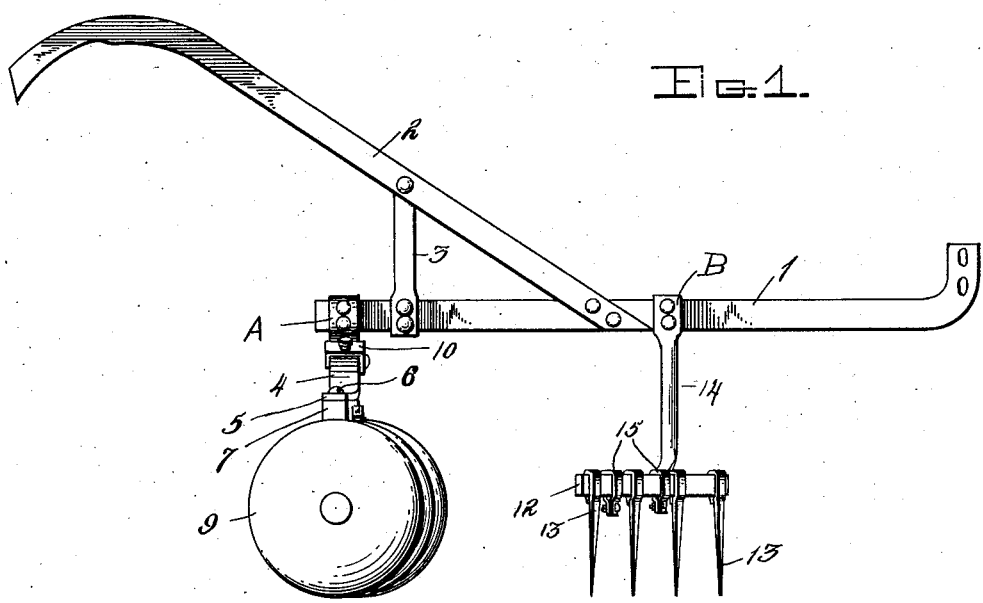
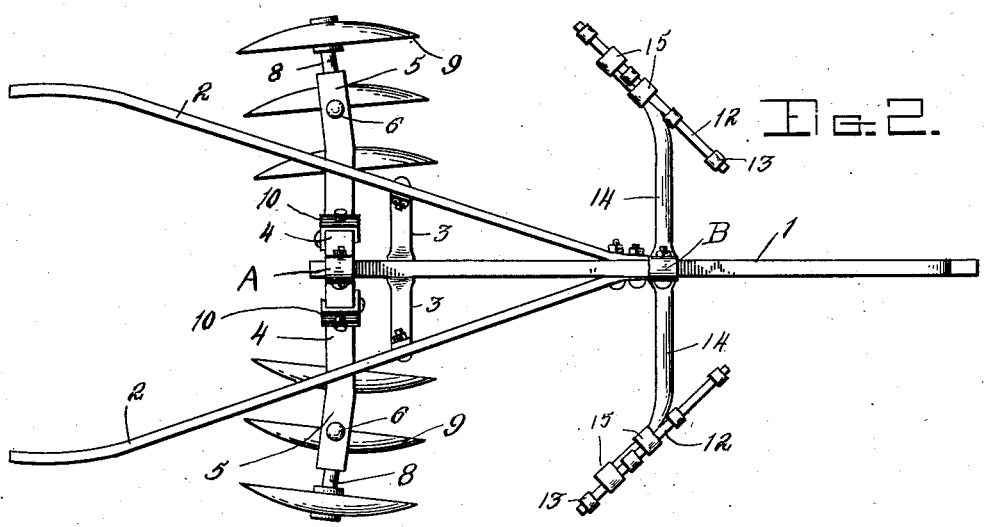
Witnesses
Alan F. Garner
Wm. Bagger
Inventor
John W. Carawan
By Victor J. Evans
Attorney

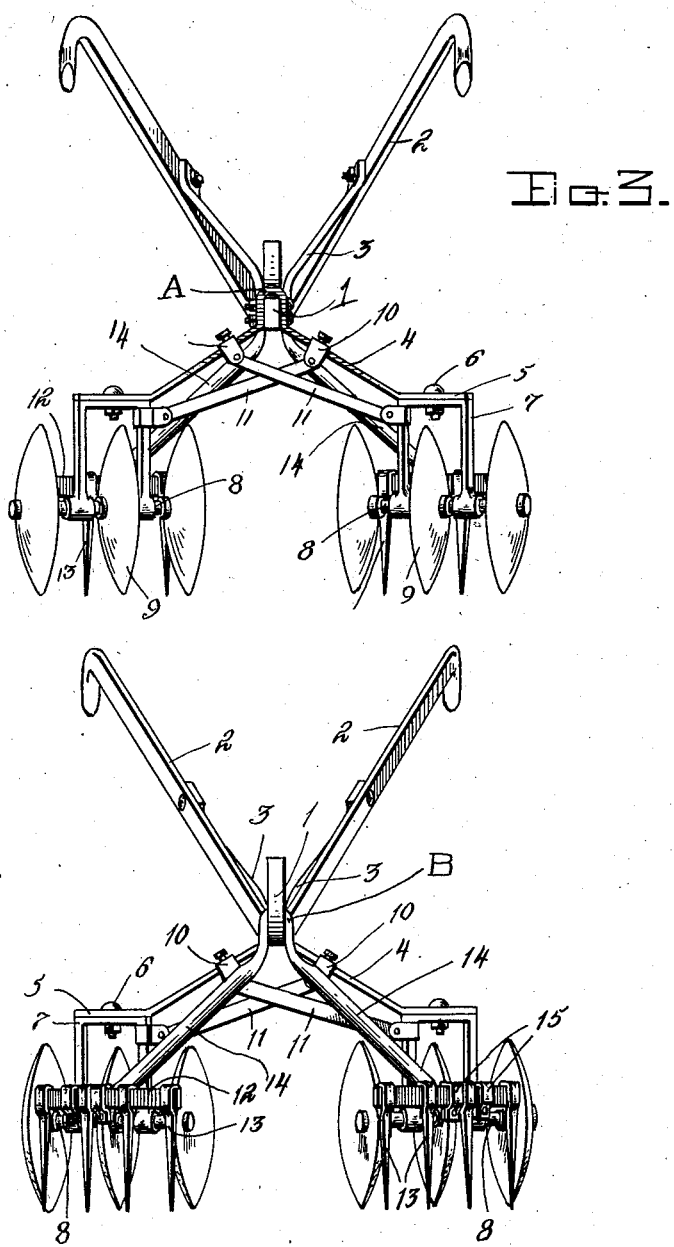

UNITED STATES PATENT OFFICE.

JOHN W. CARAWAN, OF MESIC, NORTH CAROLINA.

CULTIVATING IMPLEMENT.

1,021,573.      Specification of Letters Patent.      Patented Mar. 26, 1912.

Application filed September 23, 1911. Serial No. 650,914.

*To all whom it may concern:*

Be it known that I, JOHN W. CARAWAN, a citizen of the United States, residing at Mesic, in the county of Pamlico and State of North Carolina, have invented new and useful Improvements in Cultivating Implements, of which the following is a specification.

This invention relates to cultivating implements, and it has for its object to produce a simple and efficient device capable of being operated by a single draft animal for cultivating young crops, such as cotton, corn and the like in a simple, efficient and expeditious manner and at less expense than by the employment of more complicated tools.

A further object of the invention is to produce a simple and efficient combined cultivator and harrow which shall be efficient in destroying the weeds by pulling the same from the ground and leaving them with the roots exposed, after which the dirt will be thrown in the direction of the plants.

With these and other ends in view, which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation of an implement constructed in accordance with the invention. Fig. 2 is a top plan view of the same. Fig. 3 is a rear elevation. Fig. 4 is a front elevation.

Corresponding parts in the several figures are denoted by like characters of reference.

The beam 1 is provided with handles 2, 2 suitably connected therewith, said handles being supported by means of braces 3. Mounted upon the rear end of the beam is a yoke or arch A, the limbs of which 4, 4 are provided at their lower extremities with laterally extending flanges 5, the latter being disposed in an approximately horizontal plane. Pivot members 6, which extend through the flanges 5, serve to support yokes 7, the lower ends of which support shafts or axles 8 carrying the cultivator disks 9, one of said disks being mounted between the side members of the yoke 7 and one adjacent to the outer side of each side member, making three disks supported by each yoke. The number of disks, however, may be varied at will. Adjustably connected with each side member 4 of the arch A by means of a clip or clamp 10 is one end of a brace rod 11, the opposite end of which is suitably connected with the yoke 7 associated with the opposite limb of the arch 4. The two brace members 11 which extend diagonally across each other serve to reinforce the arch, and it will, furthermore, be seen that by means of said brace members the pivotally supported yokes carrying the cultivator disks may be supported at various adjustments to enable the said cultivator disks to be presented at the most advantageous angle for the work in hand.

Suitably mounted upon the beam 1 intermediate the front and rear ends of the latter and suitably in advance of the arch A is a similar arch B, the side members of which are equipped with harrow bars 12 having downwardly extending earth engaging teeth 13 which are disposed in advance of the cultivator disks, as shown. The bars 7 may be secured upon the limbs or side members 14 of the arch B by means of clips or similar fastening means 15 which will enable said harrow members to be removed when desired, thus enabling earth engaging members of a different character to be substituted. In view of the fact that various kinds of soil and various crop conditions require different treatment, the facility with which the harrow members can be removed for the substitution of other earth engaging members is considered very advantageous.

From the foregoing description taken in connection with the drawings hereto annexed, the operation and advantages of this invention will be readily understood.

The construction of the improved implement is extremely simple and inexpensive, and it has been found extremely economical in operation, owing to the fact that being light, it may be efficiently operated by a single draft animal and one farm hand.

Having thus described the invention, what is claimed as new, is:—

In a cultivating implement, a beam, an arch associated therewith and having laterally extending flanges, yokes pivoted upon said flanges and having disk carrying shafts, and brace members each connected adjustably with one limb of the arch and also connected with the disk carrying yoke associated with the opposite limb of said arch.

In testimony whereof I affix my signature in presence of two witnesses.

JOHN W. CARAWAN.

Witnesses:
 D. H. ABBOTT,
 U. C. HOLTON.

Copies of this patent may be obtained for five cents each, by addressing the "Commissioner of Patents, Washington, D. C."